United States Patent Office 2,999,768
Patented Sept. 12, 1961

2,999,768
COMPLEX CHROMIC COMPOUNDS
Carl Boresch, Leverkusen-Wiesdorf, Germany, assignor to Farbenfabriken Bayer Aktiengesellschaft, Leverkusen, Germany, a corporation of Germany
No Drawing. Filed July 8, 1958, Ser. No. 747,108
Claims priority, application Germany July 19, 1957
3 Claims. (Cl. 117—121)

The present invention relates to complex chromic compounds containing inorganic and organic acid radicals; more particularly it concerns such complex chromic compounds containing inorganic and organic acid radicals in which the molecular ratio of chromium to the total of the organic acid radicals is below 1:1.

Furthermore the present invention concerns a process for the production of these complex chromic compounds and a process for increasing the hydrophobic properties of a surface wherein the surface is contacted with the said complex chromic compounds.

The process of the production of complex chromic compounds of the invention consists in that complex chromic salts which contain monovalent inorganic acid radicals and monovalent or polyvalent organic acid radicals and in which the molecular ratio of chromium to the total of organic acid radicals is 1:1 or above 1:1, are mixed in organic solvents with compounds containing at least three carbon atoms and at least one carboxylic acid group so that the molecular ratio of chromium to the total of the organic acid radicals in the mixture is below 1:1. Suitable complex chromic salts containing monovalent inorganic acid radicals and monovalent or polyvalent organic acid radicals are described for instance in U.S. patent specifications Nos. 2,273,040, 2,356,161 and 2,662,835 and in French patent specifications Nos. 1,062,411 and 1,108,774; these salts are complex chromic salts obtained from inorganic chromic salts by reaction with organic acids at boiling temperature. Under the term "compounds containing at least three carbon atoms and at least one carboxylic acid group" there are to be understood, for example, aliphatic carboxylic acids, preferably those having 4–14 carbon atoms, as well as aralphatic carboxylic acids and heterocyclic carboxylic acids. Suitable solvents are for instance chlorinated hydrocarbons, aliphatic ketones and primary or secondary aliphatic alcohols.

The process for increasing the hydrophobic properties of a surface wherein the surface is contacted with the complex chromic compounds of the present invention can be used for hydrophobing a great variety of materials such as textile materials, paper, cardboard or leather. In this process the hydrophobing complex chromic compounds may be applied in conventional manner, for example in the form of solutions or dispersions in water or organic solvents, if desired also together with other hydrophobing agents such as paraffin, zirconium oxychloride or the agents described in copending application Ser. No. 601,103, which was filed on July 31, 1956, by Carl Boresch and Mathieu Quaedvlieg and is assigned to the same assignee, or in Belgian patent specification No. 560,872.

Compared with the known complex chromic compounds in which the molecular ratio of chromium to the total of the organic acid radicals is 1:1 or more, the complex chromic compounds of the present invention are distinguished inter alia by a greater hydrophobing action.

The following examples serve to illustrate the invention without, however, limiting the scope thereof, the parts and the percentages are by weight, and the parts by weight and by volume are in the ratio of kilograms to litres.

*Example 1*

A solution of 80.4 parts of chromic chloride of the formula $[CrCl_2(H_2O)_4]Cl.2H_2O$ in 208 parts of isopropyl alcohol is treated with 30.6 parts of sodium stearate and boiled under reflux for 90 mintues. 13.4 parts of a 45 percent sodium hydroxide solution are then slowly introduced dropwise with stirring into the hot solution. After boiling for a further 30 mintutes, the mixture is cooled and filtered. To the alcoholic solution of the complex chromic salt thus formed in known manner there is added at room temperature with good stirring a mixture of 44.2 parts of fatty acids having an average of 10 carbon atoms; by this addition the molecular ratio of chromium to the total of the organic acid radicals in the complex chromic salt which was 3:1 before the addition of the fatty acid mixture, is brought to 0.8:1.

40 parts by volume of the alcoholic solution obtained are then dissolved in 1000 parts by volume of water and finally treated with 6 parts by volume of 60 percent acetic acid and 4 parts by volume of a concentrated sodium hydroxide solution. A fabric of polyamide fibres is impregnated with the solution thus prepared, then squeezed to 80 percent liquor content and dried at 110° C. for 5 minutes.

The hydrophobing effect brought about with the complex chromic compound according to the invention, is essentially better than the effect attained under comparable conditions with the complex chromic salt formed in known manner in which the molecular ratio of chromium to the total of the organic acid radicals is 3:1.

*Example 2*

A solution of 53.6 parts of chromic chloride of the formula $[CrCl_2(H_2O)_4].Cl.2H_2O$ in 128.8 parts of isopropyl alcohol is treated with 30.6 parts of sodium stearate and boiled under reflux for 90 minutes. 8.9 parts of a 45 percent sodium hydroxide solution are then slowly added dropwise with good stirring to the hot solution. After boiling the mixture for a further 30 minutes, it is cooled and filtered. To the alcoholic solution of the complex chromic salt thus formed in known manner there are then added with good stirring at room temperature 24.1 parts of a mixture of fatty acids having an average of 10 carbon atoms; by this addition, the molecular ratio of chromium to the total of the organic acid radicals in the complex chromic salt which was 2:1 before the addition of the fatty acid mixture, is brought to 0.8:1.

30 parts by volume of the alcoholic solution thus obtained are then dissolved in 1000 parts by volume of water and finally treated with 5 parts by volume of 60 percent acetic acid, 3.7 parts by volume of a concentrated aqueous sodium acetate solution and 40 parts by volume of the paraffin-wax emulsion obtained according to Example 3 of U.S. application Ser. No. 601,103.

If a cotton poplin impregnated with the aforesaid solution is subjected to a spraying process according to Bundesmann, the water-repellent effect is retained for more than 10 minutes and the water-absorption is 12%; the corresponding values are 2 minutes and 20 respectively if a cotton poplin is treated under comparable conditions with a solution of a complex chromic salt having a molecular ratio of chromium to the total of the organic acid radicals of 2:1.

Similar good results can be obtained by using solutions of complex chromic salts which are prepared in the following manner:

(a) A solution of 26.8 parts of chromic chloride of the formula $[CrCl_2(H_2O)_4].Cl.2H_2O$ in 140 parts of isopropyl alcohol is treated with 32.2 parts of potassium stearate and boiled under reflux for 1 hour. The hot solution is then treated with a further 13.3 parts of chromic chloride of the aforesaid formula and with 4.2 parts of sodium bicarbonate. After boiling for a further 30 minutes, the mixture is cooled and filtered.

To an alcoholic solution of the complex chromic salt having a molecular ratio of chromium to the total of the organic acid radicals of 1.5:1, 18.5 parts of a mixture of fatty acids having an average of 10 carbon atoms, are added at room temperature with good stirring; by this addition the molecular ratio of chromium to the total of the organic acid radicals is brought to 0.7:1.

(b) To an alcoholic solution of the complex chromic salt indicated under (a) in which the molecular ratio of chromium to the total of the organic acid radicals is 1.5:1, there are added at room temperature with good stirring 31 parts of a mixture of fatty acids having an average of 10 carbon atoms; by this addition the molecular ratio of chromium to the total of the organic acid radicals is brought to 0.5:1.

(c) To an alcoholic solution of the complex chromic salt indicated under (a) in which the molecular ratio of chromium to the total of the organic acid radicals is 1.5:1, there are added with good stirring at room temperature 44.2 parts of a mixture of fatty acids having an average of 10 carbon atoms; by this addition the molecular ratio of chromium to the total of the organic acid radicals is brought to 0.4:1.

I claim:

1. A complex chromic compound containing inorganic and organic acid radicals, in which the molecular ratio of chromium to the total of the organic acid radicals is below 1:1.

2. A process for producing a complex chromic compound containing inorganic and organic acid radicals, in which the molecular ratio of chromium to the total of the organic acid radicals is below 1:1 which process consists in mixing complex chromic salts which contain organic acid radicals and monovalent inorganic acid radicals and in which the molecular ratio of chromium to the total of organic acid radicals is from 1:1 to above 1:1 in organic solvents with compounds containing at least three carbon atoms and at least one carboxylic acid group so that the molecular ratio of chromium to the total of the organic acid radicals in the mixture is below 1:1.

3. A process for increasing the hydrophobic properties of a surface wherein the surface is contacted with a complex chromic compound containing inorganic and organic acid radicals, in which the molecular ratio of chromium to the total of the organic acid radicals is below 1:1.

References Cited in the file of this patent
UNITED STATES PATENTS

| | | |
|---|---|---|
| 2,273,040 | Iler | Feb. 17, 1942 |
| 2,544,666 | Goebel et al. | Mar. 13, 1951 |
| 2,683,156 | Iler | July 6, 1954 |